United States Patent
Hsieh (10) Patent No.: US 9,794,393 B2
(45) Date of Patent: Oct. 17, 2017

(54) BLUETOOTH AUDIO PACKET SHARING METHOD

(71) Applicant: AIROHA TECHNOLOGY CORP., Hsinchu (TW)

(72) Inventor: Kuen-Rong Hsieh, Hsinchu (TW)

(73) Assignee: Airoha Technology Corp., Hsinchu (TW)

( * ) Notice: Subject to any disclaimer, the term of this patent is extended or adjusted under 35 U.S.C. 154(b) by 0 days.

(21) Appl. No.: 14/953,074

(22) Filed: Nov. 27, 2015

(65) Prior Publication Data

US 2016/0316051 A1      Oct. 27, 2016

(30) Foreign Application Priority Data

Apr. 23, 2015   (TW) .............................. 104113027 A (51) Int. Cl.
*H04B 7/00* (2006.01)
*H04M 1/725* (2006.01)
*H04W 4/06* (2009.01)
*H04W 4/00* (2009.01)
*H04M 1/60* (2006.01)

(52) U.S. Cl.
CPC ......... *H04M 1/7253* (2013.01); *H04W 4/008* (2013.01); *H04W 4/06* (2013.01); *H04M 1/6066* (2013.01); *H04M 2250/02* (2013.01)

(58) Field of Classification Search
None
See application file for complete search history.

(56) References Cited

U.S. PATENT DOCUMENTS

| | | | |
|---|---|---|---|
| 2008/0291863 A1 | 11/2008 | Agren | |
| 2010/0156812 A1* | 6/2010 | Stallings | G06F 3/04883 345/173 |
| 2010/0232618 A1 | 9/2010 | Haartsen | |
| 2010/0303244 A1* | 12/2010 | Kim | H04H 20/33 381/2 |
| 2012/0058727 A1 | 3/2012 | Cook et al. | |
| 2012/0229400 A1* | 9/2012 | Birnbaum | G06F 3/016 345/173 |
| 2014/0192988 A1 | 7/2014 | Solum | |

(Continued)

FOREIGN PATENT DOCUMENTS

| CN | 101742405 A | 6/2010 |
|---|---|---|
| CN | 104320843 A | 1/2015 |

(Continued)

*Primary Examiner* — Mohammed Rachedine
(74) *Attorney, Agent, or Firm* — Rosenberg, Klein & Lee (57) ABSTRACT

A Bluetooth audio packet sharing method comprises an electronic device, a first Bluetooth speaker and at least one second Bluetooth speaker. The electronic device establishes Bluetooth connection with the first Bluetooth speaker by a Bluetooth link information, and the first Bluetooth speaker is able to receive an audio packet from the electronic device. The electronic device or the first Bluetooth speaker broadcasts the Bluetooth link information. The second Bluetooth speaker is close to the electronic device and the first Bluetooth speaker, and receives the link information broadcasted by the first Bluetooth device. Thus, the second Bluetooth speaker is able to receive or share the audio packet transmitted by the electronic device by the Bluetooth link information.

19 Claims, 4 Drawing Sheets

(56) References Cited

U.S. PATENT DOCUMENTS

2014/0206290 A1* 7/2014 Lee ................... H04W 8/005
                                                455/41.2
2015/0289124 A1* 10/2015 Palin .................. H04W 8/005
                                                455/41.2

FOREIGN PATENT DOCUMENTS

| CN | 104469980 A | 3/2015 |
|---|---|---|
| WO | 2014/086388 A1 | 6/2014 |

* cited by examiner

BLUETOOTH AUDIO PACKET SHARING METHOD

REFERENCE TO RELATED APPLICATIONS

This non-provisional application claims priority claim under 35 U.S.C. §119(a) on Taiwan Patent Application No. 104113027 filed Apr. 23, 2015, the entire contents of which are incorporated herein by reference.

FIELD OF THE INVENTION

The present invention relates to a Bluetooth audio packet sharing method for a plurality of Bluetooth speakers to receive and play audio packet transmitted by an electronic device.

BACKGROUND

Bluetooth is a wireless technology standard for exchanging data over short distances. When two electronic devices transmit data via Bluetooth, one electronic device can be defined as a Master, and the other electronic device can be defined as a Slave. The pairing process between the master and the slave is triggered by a specific request from a user to establish personal area networks, and two electronic devices are able to transmit data via wireless connection. In generally, the master may be a mobile phone, and the slaver may be a Bluetooth headset or Bluetooth speaker. The mobile phone is able to transmit an audio packet to the Bluetooth headset or speaker, and the Bluetooth headset or speaker is able to transmit the audio packet to the mobile phone.

SUMMARY

It is one object of the present invention to provide a Bluetooth audio packet sharing method. An electronic device and a first Bluetooth speaker establish a Bluetooth connection by a Bluetooth link information, and the first Bluetooth speaker or the electronic device 11 broadcasts the Bluetooth link information. Other Bluetooth speaker(s) that closes to the electronic device and/or the first Bluetooth speaker is able to receive the Bluetooth link information broadcasted by the first Bluetooth speaker or the electronic device 11, and receive or share the audio packet transmitted by the electronic device via the Bluetooth link information.

It is one object of the present invention to provide a Bluetooth audio packet sharing method. It is unnecessary to change the establishment method of Bluetooth connection or Bluetooth transmission between the electronic device and the Bluetooth speaker(s), and a plurality of Bluetooth speakers are able to receive the audio packet from the electronic device.

For achieving above objects, the present invention provides a Bluetooth audio packet sharing method for an electronic device and a first Bluetooth speaker, and comprising steps of: establishing a Bluetooth connection between said electronic device and said first Bluetooth speaker by a Bluetooth link information; and broadcasting said Bluetooth link information by said first Bluetooth speaker or said electronic device.

BRIEF DESCRIPTION OF THE DRAWINGS

The structure as well as preferred modes of use, further objects, and advantages of this invention will be best understood by referring to the following detailed description of some illustrative embodiments in conjunction with the accompanying drawings, in which.

DETAILED DESCRIPTION OF THE PREFERRED EMBODIMENTS

Figure 1:
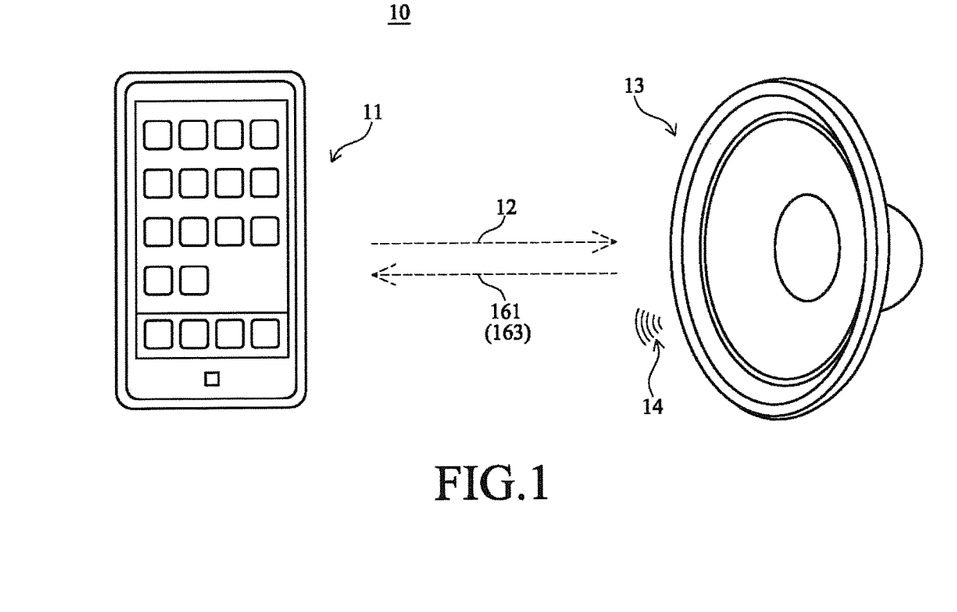
FIG. 1 is a Bluetooth audio packet transmission system according to an embodiment of the present invention.
Figure 2:
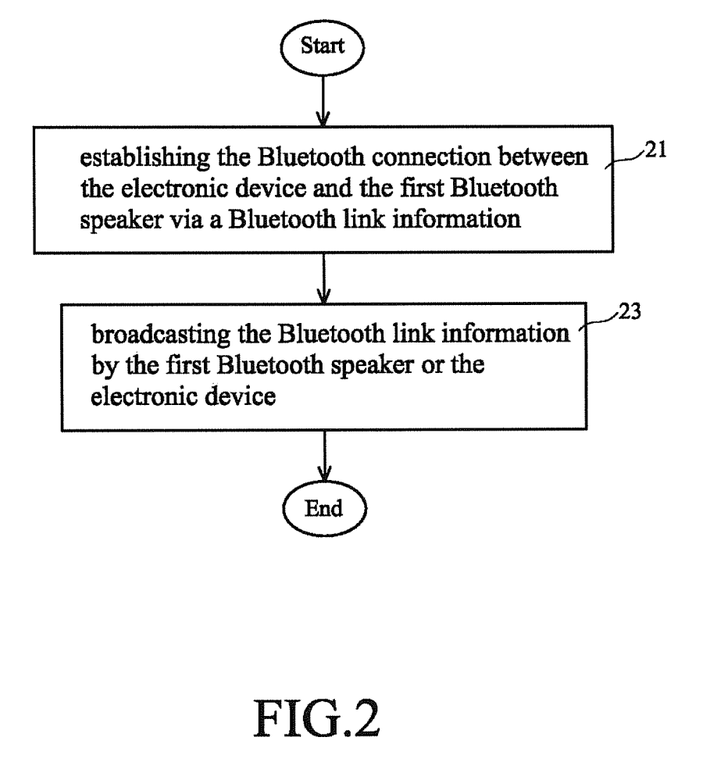
FIG. 2 is a flow chart of Bluetooth audio packet sharing method according to an embodiment of the present invention.

FIG. 1 is a block diagram of a Bluetooth audio packet transmission system according to an embodiment of the present invention, and FIG. 2 is a flow chart of Bluetooth audio packet sharing method according to an embodiment of the present invention. The Bluetooth audio packet transmission system 10 comprises an electronic device 11 and a first Bluetooth speaker 13. For example, the electronic device 11 may be a computer, a laptop computer, a mobile phone, a smart phone, a tablet PC or a media player with Bluetooth, and the first Bluetooth speaker 13 may be a Bluetooth headset or a Bluetooth hands-free. The pairing process between the electronic device 11 and the first Bluetooth speaker 13 is triggered to establish Bluetooth connection therebetween. Thereafter, the first Bluetooth speaker 13 is able to receive, operate or convert at least one audio packet 12 from the electronic device 11, and then play converted audio packet 12.

In this embodiment of the invention, the electronic device 11 is a master, and the first Bluetooth speaker 13 is a slave. The electronic device 11 comprises a Bluetooth link information 14, such as Bluetooth device address (BD_ADDR), Bluetooth clock (BT clock), channel map and link key. As the electronic device 11 pairs with the first Bluetooth speaker 13, the electronic device 11 is able to transmit the Bluetooth link information 14 to the first Bluetooth speaker 13 to establish Bluetooth connection between the electronic device 11 and the first Bluetooth speaker 13 according to the received Bluetooth link information, as the step 21.

In generally, the frequency range of Bluetooth is about 2.400 GHz to 2.4825 GHz. The frequency range may be divided into 79 Bluetooth channels, and each Bluetooth channel has bandwidth of 1 MHz.

Bluetooth uses frequency-hopping spread spectrum to select one of Bluetooth channels to transmit data. The electronic device (Master) 11 and the first Bluetooth speaker (Slave) 13 are able to generate a pseudo-random hopping sequence according to BD_ADDR and BT clock of the electronic device 11, and then the electronic device 11 and the first Bluetooth speaker 13 are able to select one of Bluetooth channels to transmit the audio packet 12 according to the pseudo-random hopping sequence.

Further, the electronic device (Master) 11 may comprise a channel map to describe Bluetooth channels that do not be used or interfered by others. For example, part of Bluetooth channels may be used or interfered by other devices, and thus the electronic device 11 and the first Bluetooth speaker 13 cannot use those Bluetooth channels to transmit data.

Thus, the electronic device 11 and the first Bluetooth speaker 13 not only selects Bluetooth channel to transmit the audio packet 12 according to the pseudo-random hopping sequence, but also avoids to use the occupied or interfered Bluetooth channel(s) according to channel map.

Further, the electronic device 11 may encode the transmitted audio packet 12 by a link key, and the first Bluetooth speaker 13 may decode the received audio packet 12 by the link key.

As the electronic device 11 and the first Bluetooth speaker 13 have established the Bluetooth connection therebetween, the electronic device 11 is able to transmit at least one audio packet 12 to the first Bluetooth speaker 13. Further, the first Bluetooth speaker 13 may transmit a positive acknowledgment (ACK) 161 to the electronic device 11 after receiving the audio packet 12. Thus, the electronic device 11 is able to know that the first Bluetooth speaker 13 has received the audio packet 12 by the positive acknowledgment 161, and then the electronic device 11 is able to transmit other audio packet 12.

Conversely, if the first Bluetooth speaker 13 does not receive the audio packet 12, it will transmit a negative acknowledgement (NACK) 163 to the electronic device 11. The electronic device 11 is able to know that the first Bluetooth speaker 13 fails to receive the audio packet 12 by the negative acknowledgement 163, and then the electronic device 11 is able to transmit the same audio packet 12 again. For instance, the electronic device 11 transmits the audio packet 12 that has been transmitted again.

In other embodiment of the invention, the first Bluetooth speaker 13 may not transmit the negative acknowledgement 163 to the electronic device 11, as the first Bluetooth speaker 13 fails to receive the audio packet 12. Thus, as the electronic device 11 does not receive the positive acknowledgement 161 from the first Bluetooth speaker 13, the electronic device 11 will determine that the first Bluetooth speaker 13 fails to receive the audio packet 12, and then transmits the audio that has been transmitted again.

The Bluetooth link information 14 and the Bluetooth connection establishing method between the electronic device 11 and the first Bluetooth speaker 13 are common Bluetooth technology. Thus, one skilled in the art is able to know foregoing Bluetooth link information and Bluetooth connection establishing method according to common Bluetooth technology.

The features of the invention are the first Bluetooth speaker (slaver) 13 receiving the Bluetooth link information 14 from the electronic device (master) 11, establishing Bluetooth connection with the electronic device 11 by the Bluetooth link information 14, and the first Bluetooth speaker 13 or the electronic device 11 broadcasting the Bluetooth link information 14, as step 23. Thus, if other Bluetooth speaker(s) closes to the electronic device 11 and the first Bluetooth speaker 13, those Bluetooth speaker(s) can receive the Bluetooth link information 14 broadcasted by the first Bluetooth speaker 13. The detail connecting method will be described in below embodiment. Further, other Bluetooth speaker(s) is not a necessary device of the invention, and is not limitation of the invention.

Figure 3:
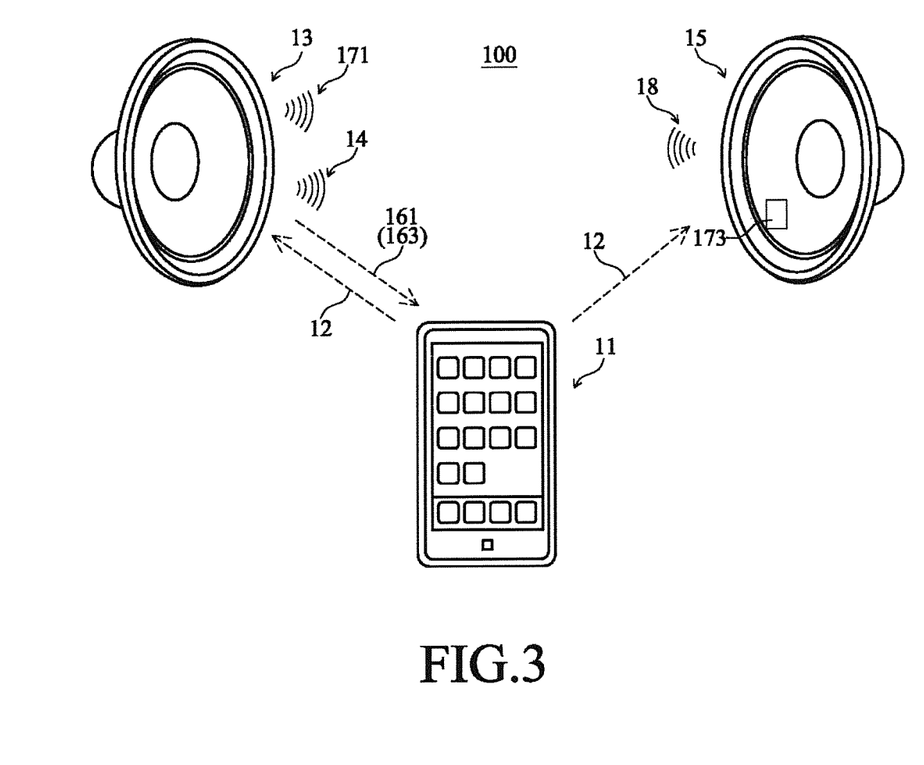
FIG. 3 is a block diagram of a Bluetooth audio packet transmission system according to another embodiment of the present invention.
Figure 4:
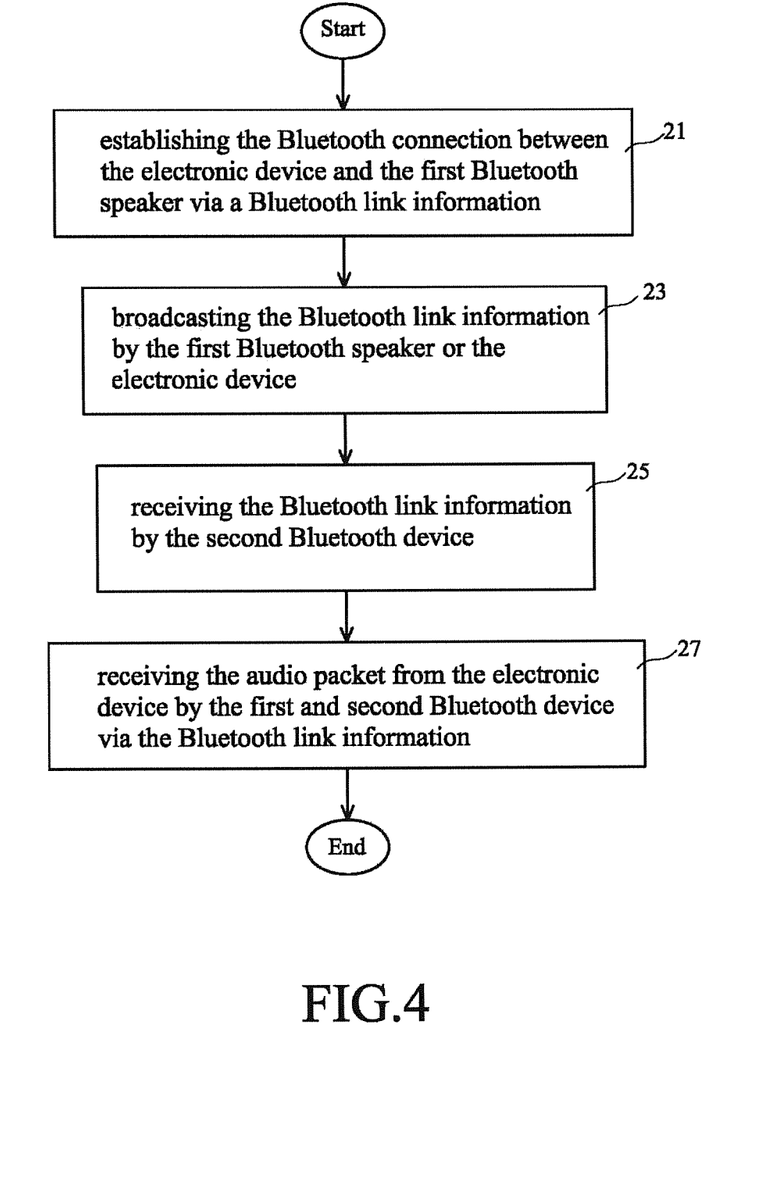
FIG. 4 is a flow chart of Bluetooth audio packet sharing method according to another embodiment of the present invention.

FIG. 3 is a block diagram of a Bluetooth audio packet transmission system according to another embodiment of the present invention, and FIG. 4 is a flow chart of Bluetooth audio packet sharing method according to another embodiment of the present invention. The Bluetooth audio packet transmission system 100 comprises an electronic device 11, a first Bluetooth speaker 13 and at least one second Bluetooth speaker 15. For example, the electronic device 11 may be a computer, a laptop computer, a mobile phone, a smart phone, a tablet PC or a media player with Bluetooth, and the first Bluetooth speaker 13 and the second Bluetooth speaker 15 may be a Bluetooth headset or Bluetooth handsfree.

The first Bluetooth speaker 13 establishes Bluetooth connection with the electronic device 11 by a Bluetooth link information 14, as the step 21. Thereafter, the first Bluetooth speaker 13 or the electronic device 11 broadcasts the Bluetooth link information 14, such as Bluetooth device address (BD_ADDR), Bluetooth clock (BT clock), channel map and link key, as the step 23. The steps 21 and 23 have been described in above embodiment, which are not repeatedly described therein.

As the second Bluetooth speaker 15 is near the electronic device 11 and the first Bluetooth speaker 13, the second Bluetooth speaker 15 is able to receive the Bluetooth link information 14 broadcasted by the first Bluetooth speaker 13 or the electronic device 11, as the step 25. Even without the second Bluetooth speaker 15, the first Bluetooth speaker 13 or the electronic device 11 still broadcasts the Bluetooth link information, and the second Bluetooth speaker 15 closing the electronic device 11 and the first Bluetooth speaker 13 is able to receive the Bluetooth link information 14. Thus, the second Bluetooth speaker 15 is not a necessary device of the invention, and is not limitation of the invention.

The first Bluetooth speaker 13 is able to receive the audio packet 12 transmitted by the electronic device 11 via the Bluetooth connection. Further, the second Bluetooth speaker 15 is able to receive the audio packet 12 transmitted by the electronic device 11 via the Bluetooth link information 14 of the electronic device 11 and the first Bluetooth speaker 13, as the step 27.

The number of the second Bluetooth speaker 15 may be one or more than one, and those second Bluetooth speakers 15 are able to receive the Bluetooth link information 14 broadcasted by the first Bluetooth speaker 13 or the electronic device 11. Then, those Bluetooth speakers 15 are able to receive the audio packet 12 transmitted by the electronic device 11 via the Bluetooth link information 14.

Although there are one or more second Bluetooth speakers 15 receiving the audio packet 12 transmitted by the electronic device 11. However, the method of second Bluetooth speakers 15 receiving the audio packet 12 is similar to tap the audio packet 12 between the electronic device 11 and the first Bluetooth speaker 13. For instance, the Bluetooth speaker(s) 15 tap the audio packet 12 transmitted from the electronic device 11 to the first Bluetooth speaker 13.

In actual application, the electronic device 11 only establishes Bluetooth connection with the first Bluetooth speaker 13, and the second Bluetooth speaker(s) 15 does not establish Bluetooth connection with the electronic device 11 actually. Thus, the electronic device 11 does not detect the second Bluetooth speaker(s) 15 receiving the audio packet 12, and it is unnecessary to change method of Bluetooth connection and transmitting the audio packet 12 between the electronic device 11 and the first Bluetooth speaker 13. For instance, the first Bluetooth speaker 13 and at least one second Bluetooth speaker 15 that are near each other are able to receive the audio packet 12 transmitted by the electronic device 11.

In generally, as the first Bluetooth speaker (slaver) 13 receives the audio packet 12, the first Bluetooth speaker 13 will use a Cyclic Redundancy Check (CRC) to check the audio packet 12. When the audio packet 12 received by the first Bluetooth speaker 13 is correct, the first Bluetooth speaker 13 will transmit a positive acknowledgment (ACK) 161 to the electronic device 11. Thus, the electronic device 11 is able to know that the first Bluetooth speaker 13 has received the transmitted audio packet 12 according to the positive acknowledgment 161, and then the electronic device 11 is able to transmit other audio packet 12.

Conversely, if the first Bluetooth speaker 13 fails to receive the audio packet 12 or receives an incorrect audio packet 12, the first Bluetooth speaker 13 will not transmit the positive acknowledge 161 to the electronic device 11 or transmit a negative acknowledgement (NACK) 163 to the electronic device 11. As the electronic device 11 does not receive the positive acknowledge 161 or receives the negative acknowledge 163, the electronic device 11 is able to know that the first Bluetooth speaker 13 fails to receive the transmitted audio packet 12. Then the electronic device 11 will transmit the same audio packet 12 again. For instance, the electronic device 11 transmits the audio packet 12 that has been transmitted again.

However, the second Bluetooth speaker 15 does not really establish the Bluetooth connection with the electronic device 11, and is unable to transmit the positive acknowledge 161 or the negative acknowledge 163 to the electronic device 11. Thus, the electronic device 11 is unable to know the second Bluetooth speaker 15 failing to receive the audio packet 12, and does not transmit the audio packet 12 that has been transmitted again.

Thus, the invention provides two kind of method to solve above problem, and improves the probability of the second Bluetooth speaker 15 receiving the audio packet 12. The first method is that the first Bluetooth speaker 13 always transmits at least one negative acknowledgement 163 to the electronic device 11, whether the first Bluetooth speaker 13 receives the audio packet 12 from the electronic device 11 or not. Thus, the electronic device 11 always transmits the same audio packet 12 twice or more than twice.

The difference between the first method and the prior art is that even if the first Bluetooth speaker 13 has receives the correct audio packer 12 form the electronic device 11, the first Bluetooth speaker 13 still transmits the negative acknowledgement 163 to the electronic device 11 at least once. In actual application, the first Bluetooth speaker 13 may transmit the negative acknowledgement 163 once or more than once, and the electronic device 11 transmits same audio packet 12 once or more than once according to the negative acknowledgement 163. Further, when the first Bluetooth speaker 13 has received correct audio packet 12 and has transmitted the negative acknowledgement 163 once or more than once, the first Bluetooth speaker 13 transmits the positive acknowledgement 161 to the electronic device 11. Then, the electronic device 11 is able to transmit other audio packet 12.

In other embodiment of the invention, the first Bluetooth speaker 13 may not transmit the negative acknowledgement 163 to the electronic device 11 once or more than once, as the first Bluetooth speaker 13 does not receive the audio packet 12. For instance, as the electronic device 11 does not receive the positive acknowledgement 161 from the first Bluetooth speaker 13, the electronic device 11 can determine that the first Bluetooth speaker 13 fails to receive the audio packet 12, and then transmits the audio packet 12 that has been transmitted again. Thus, the first Bluetooth speaker 13 does not transmit the positive acknowledgement 161 to the electronic device 11 until it receives same audio packet 12 twice or more than twice. For instance, when the first Bluetooth speaker 13 receives the correct audio packet 12, it does not transmit the positive acknowledgement 161 to the electronic device 11. Then, the electronic device 11 determines the first Bluetooth speaker 13 failing to receive the audio packet 12, and then transmits the audio packet 12 that has been transmitted before.

According to the first method, the electronic device 11 always transmits same audio packer 12 twice or more than twice to improve probability of the second Bluetooth speaker 15 receiving the audio packet.

The second method is that the second Bluetooth speaker 13 transmits an interference signal 18, when the second fails to receive the audio packet 12 or receives incorrect audio packet 12. The frequency band of the interference signal 18 is similar to the positive acknowledgement 161, and the time point of the second Bluetooth speaker 15 transmitting the interference signal 18 is similar to the first Bluetooth speaker 13 transmitting the positive acknowledgment 161. Then, the interference signal 18 is able to interfere the electronic device 11 to receive the positive acknowledgement 161 transmitted by the first Bluetooth speaker 13. Thus, the electronic device 11 fails to receive the positive acknowledgement 161, and transmits the audio packed 12 that has transmitted again. Thereafter, although the second Bluetooth speaker 15 cannot transmit the negative acknowledgement 163 to the electronic device 11, but it is able to interfere or fail the electronic device 11 to receive the positive acknowledgement 161.

The second Bluetooth speaker 15 is able to know the frequency band of the positive acknowledgement 161 and time point of the first Bluetooth speaker 13 transmitting the positive acknowledgement 161 according to the Bluetooth link information 14. Thus, the second Bluetooth speaker 15 is able to fail the electronic device 11 to receive the positive acknowledgement 161.

In actual application, the number of the interference signal 18 transmitted by the second Bluetooth speaker 15 may be limited to avoid failing the Bluetooth audio packet transmission system 100 due to breakdown of one of second Bluetooth speakers 15.

Further, the first method and the second method may be executed at same time to reduce probability of the second Bluetooth speaker 15 failing to receive the audio packet 12.

The first Bluetooth speaker 13 and the second Bluetooth speaker 15 may not paly the audio packet 12 synchronously, because the second Bluetooth speaker 15 does not establish Bluetooth connection with the electronic device 11 actually.

In generally, the audio packet 12 comprises a plurality of the samples, and the first Bluetooth speaker 13 and the second Bluetooth speaker 15 are able to decode and/or convert samples of the audio packet 12.

The first Bluetooth speaker 13 acquires a sampling number of the audio packet 12 converted at a first time point to generate a first sampling number 171, and then the first Bluetooth speaker 13 broadcasts the first sampling number 171. The second Bluetooth speaker 15 acquires the sampling number of the audio packer 12 converted at the first time point to generate a second sampling number 173, and the second Bluetooth speaker 15 receives the first sampling number 171 broadcasted by the first Bluetooth speaker 13. The first time points that the first Bluetooth speaker 13 and the second Bluetooth speaker 15 acquire the sampling number of the audio packer 12 should be the same, because the first Bluetooth speaker 13 and the second Bluetooth speaker 15 have same time clock.

Thereafter, the second Bluetooth speaker 15 is able to compare the first sampling number 171 and the second sampling number 173. If the first sampling number 171 is equal to the second sampling number 173 at the same time point, the first Bluetooth speaker 13 and the second Bluetooth speaker 15 paly the audio packet 12 synchronously. Conversely, if the first sampling number 171 is not equal to the second sampling number 173 at the same time point, the first Bluetooth speaker 13 and the second Bluetooth speaker 15 paly the audio packet 12 non-synchronously. Thus, the second Bluetooth speaker 15 is able to adjust a sample rate of the audio packet 12 according to the first sampling number 171 and the second sampling number 173, and the first Bluetooth speaker 13 and the second Bluetooth speaker 15 are able to play the audio packet 12 synchronously.

In actual application, above synchronous method may be repeated during a time interval, and then the first Bluetooth speaker 13 and the second Bluetooth speaker 15 always play the audio packet 12 synchronously. Further, the number of the second Bluetooth speaker 15 may be one or more than one. For instance, a plurality of second Bluetooth speakers 15 are able to receive the first sampling number 171 broadcasted by the first Bluetooth speaker 13, and adjust the sample rate of the audio packet 12 according to the first sampling number 171. Thus, the first Bluetooth speaker 13 and those second Bluetooth speakers 15 are able to play the audio packet 12 synchronously.

The above disclosure is only the preferred embodiment of the present invention, and not used for limiting the scope of the present invention. All equivalent variations and modifications on the basis of shapes, structures, features and spirits described in claims of the present invention should be included in the claims of the present invention.

What is claimed is:

1. A Bluetooth audio packet sharing method for an electronic device and a first Bluetooth speaker, comprising:
    establishing a Bluetooth connection between said electronic device and said first Bluetooth speaker by Bluetooth link information corresponding thereto;
    broadcasting said Bluetooth link information by said first Bluetooth speaker or said electronic device to a slave device, wherein said slave device is configured according to said Bluetooth link information of said first Bluetooth speaker to concurrently receive data transmitted between said electronic device and said first Bluetooth speaker; and
    transmitting at least one audio packet by said electronic device;
    receiving said audio packet by said first Bluetooth speaker; and
    transmitting a positive acknowledgment to said electronic device from said first Bluetooth speaker;
    wherein said slave device is a second Bluetooth speaker, and further comprising:
        receiving said audio packet transmitted from said electronic device by said second Bluetooth speaker via said Bluetooth link information;
        failing to receive said audio packet or receiving said audio packet that is an incorrect audio packet by said second Bluetooth speaker;
        transmitting an interference signal by said second Bluetooth speaker, wherein said interference signal is able to interfere with said positive acknowledgment transmitted from said first Bluetooth speaker to said electronic device; and
        transmitting said audio packet again by said electronic device.

2. The Bluetooth audio packet sharing method according to claim 1, wherein said Bluetooth link information includes either one of a Bluetooth device address, Bluetooth clock, channel map and link key.

3. The Bluetooth audio packet sharing method according to claim 1, comprising:
    receiving said audio packet that is a correct audio packet by said first Bluetooth speaker;
    transmitting at least one negative acknowledgment to said electronic device from said first Bluetooth speaker; and
    transmitting said audio packet again by said electronic device.

4. The Bluetooth audio packet sharing method according to claim 3, further comprising:
    failing to receive said audio packet or receiving said audio packet that is an incorrect audio packet by said second Bluetooth speaker;
    transmitting an interference signal by said second Bluetooth speaker, wherein said interference signal is able to interfere with said positive acknowledgment transmitted from said first Bluetooth speaker to said electronic device; and
    transmitting said audio packet again by said electronic device.

5. The Bluetooth audio packet sharing method according to claim 1, wherein said slave device is a second Bluetooth speaker, and further comprising:
    receiving said audio packet transmitted from said electronic device by said second Bluetooth speaker via said Bluetooth link information;
    receiving twice or more than twice same said audio packet by said first Bluetooth speaker; and
    transmitting a positive acknowledgment to said electronic device by said first Bluetooth speaker.

6. The Bluetooth audio packet sharing method according to claim 1, wherein a frequency band of said interference signal and said positive acknowledgment is similar, and a time point of transmitting said interference signal and said positive acknowledgment is similar.

7. The Bluetooth audio packet sharing method according to claim 1, further comprising:
    transmitting data by said electronic device; and
    prompting said electronic device to retransmit said data, wherein said slave device is configured according to said Bluetooth link information to receive the retransmitted data.

8. A Bluetooth audio packet sharing method for an electronic device and a first Bluetooth speaker, comprising:
    establishing a Bluetooth connection between said electronic device and said first Bluetooth speaker by a Bluetooth link information;
    broadcasting said Bluetooth link information by said first Bluetooth speaker or said electronic device;
    transmitting at least one audio packet by said electronic device;
    receiving said audio packet by said first Bluetooth speaker;
    transmitting a positive acknowledgment to said electronic device from said first Bluetooth speaker;
    providing at least one second Bluetooth speaker;
    receiving said Bluetooth link information by said second Bluetooth speaker;
    failing to receive said audio packet or receiving said audio packet that is an incorrect audio packet by said second Bluetooth speaker;
    transmitting an interference signal by said second Bluetooth speaker, wherein said interference signal is able to interfere with said positive acknowledgment transmitted from said first Bluetooth speaker to said electronic device; and transmitting said audio packet again by said electronic device.

9. The Bluetooth audio packet sharing method according to claim 8, wherein a frequency band of said interference signal and said positive acknowledgment is similar, and a time point of transmitting said interference signal and said positive acknowledgment is similar.

10. A Bluetooth audio packet sharing method for an electronic device and a first Bluetooth speaker, comprising:
establishing a Bluetooth connection between said electronic device and said first Bluetooth speaker by a Bluetooth link information;
broadcasting said Bluetooth link information by said first Bluetooth speaker or said electronic device;
transmitting at least one audio packet by said electronic device;
receiving said audio packet by said first Bluetooth speaker;
transmitting a positive acknowledgment to said electronic device from said first Bluetooth speaker;
providing at least one second Bluetooth speaker;
receiving said Bluetooth link information by said second Bluetooth speaker;
receiving said audio packet transmitted from said electronic device by said second Bluetooth speaker via said Bluetooth link information;
converting said audio packet by said first Bluetooth speaker;
acquiring a sampling number of said audio packet converted by said first Bluetooth speaker at a first time point to generate a first sampling number; and
broadcasting said first sampling number by said first Bluetooth speaker.

11. The Bluetooth audio packet sharing method according to claim 10, further comprising:
converting said audio packet by said second Bluetooth speaker;
receiving said first sampling number from said first Bluetooth speaker by said second Bluetooth speaker;
acquiring said sampling number of said audio packet converted by said second Bluetooth speaker at said first time point to generate a second sampling number; and
adjusting sample rate of said audio packet converted by said second Bluetooth speaker according to said first sampling number and said second sampling number.

12. A Bluetooth audio packet sharing method for an electronic device and a first Bluetooth speaker, comprising:
establishing a Bluetooth connection between said electronic device and said first Bluetooth speaker by Bluetooth link information corresponding thereto;
broadcasting said Bluetooth link information by said first Bluetooth speaker or said electronic device to a slave device, wherein said slave device is configured according to said Bluetooth link information of said first Bluetooth speaker to concurrently receive data transmitted between said electronic device and said first Bluetooth speaker; and
transmitting at least one audio packet by said electronic device;
receiving said audio packet by said first Bluetooth speaker;
transmitting a positive acknowledgment to said electronic device from said first Bluetooth speaker;
converting said audio packet by said first Bluetooth speaker;
acquiring a sampling number of said audio packet converted by said first Bluetooth speaker at a first time point to generate a first sampling number; and
broadcasting said first sampling number by said first Bluetooth speaker wherein said slave device is a second Bluetooth speaker, and further comprising:
receiving said audio packet transmitted from said electronic device by said second Bluetooth speaker via said Bluetooth link information.

13. The Bluetooth audio packet sharing method according to claim 12, further comprising:
converting said audio packet by said second Bluetooth speaker;
receiving said first sampling number from said first Bluetooth speaker by said second Bluetooth speaker;
acquiring said sampling number of said audio packet converted by said second Bluetooth speaker at said first time point to generate a second sampling number; and
adjusting sample rate of said audio packet converted by said second Bluetooth speaker according to said first sampling number and said second sampling number.

14. The Bluetooth audio packet sharing method according to claim 12, wherein said Bluetooth link information includes either one of a Bluetooth device address, Bluetooth clock, channel map and link key.

15. The Bluetooth audio packet sharing method according to claim 12, comprising:
receiving said audio packet that is a correct audio packet by said first Bluetooth speaker;
transmitting at least one negative acknowledgment to said electronic device from said first Bluetooth speaker; and
transmitting said audio packet again by said electronic device.

16. The Bluetooth audio packet sharing method according to claim 15, further comprising:
failing to receive said audio packet or receiving said audio packet that is an incorrect audio packet by said second Bluetooth speaker;
transmitting an interference signal by said second Bluetooth speaker, wherein said interference signal is able to interfere with said positive acknowledgment transmitted from said first Bluetooth speaker to said electronic device; and
transmitting said audio packet again by said electronic device.

17. The Bluetooth audio packet sharing method according to claim 12, wherein said slave device is a second Bluetooth speaker, and further comprising:
receiving said audio packet transmitted from said electronic device by said second Bluetooth speaker via said Bluetooth link information;
receiving twice or more than twice same said audio packet by said first Bluetooth speaker; and
transmitting a positive acknowledgment to said electronic device by said first Bluetooth speaker.

18. The Bluetooth audio packet sharing method according to claim 12, wherein a frequency band of said interference signal and said positive acknowledgment is similar, and a time point of transmitting said interference signal and said positive acknowledgment is similar.

19. The Bluetooth audio packet sharing method according to claim 12, further comprising:
transmitting data by said electronic device; and
prompting said electronic device to retransmit said data, wherein said slave device is configured according to said Bluetooth link information to receive the retransmitted data.

* * * * *